G. A. Mitchell.
Swaging Boot and Shoe Tips.
No. 1,500. Reissued Jun. 16, 1863.
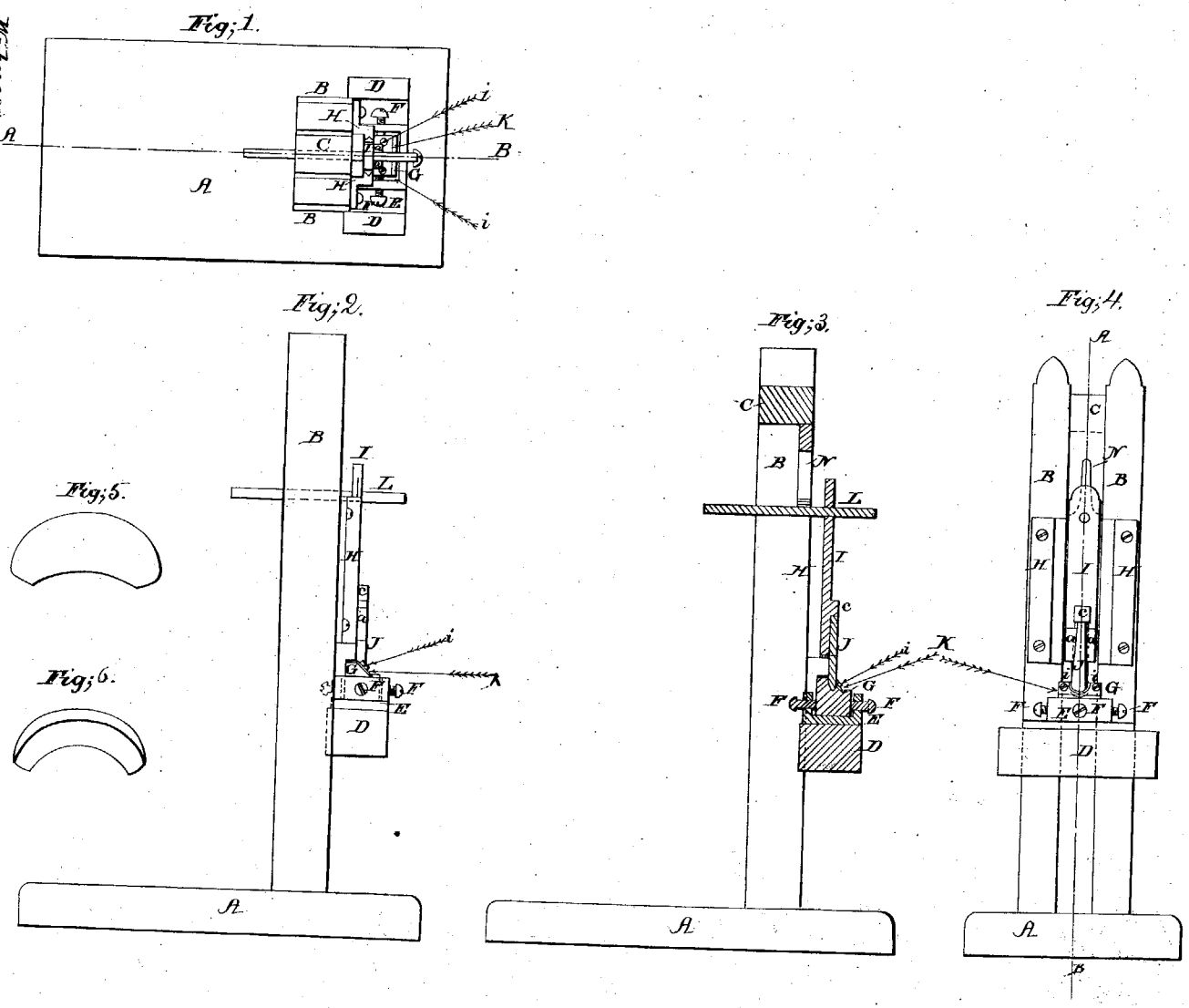
Witnesses;
Temple Iglitts
M. B. Smith
Inventor;
Geo. A. Mitchell
By Atty E. N. Scott
N. PETERS, PHOTO-LITHOGRAPHER, WASHINGTON, D.C.

UNITED STATES PATENT OFFICE.

THE AMERICAN SHOE TIP COMPANY, OF NEW HAVEN, CONNECTICUT, ASSIGNEES, BY MESNE ASSIGNMENTS, OF GEORGE A. MITCHELL.

IMPROVEMENT IN MACHINES FOR SWAGING SHOE-TIPS.

Specification forming part of Letters Patent No. 28,888, dated June 26, 1860; Reissue No. 1,500, dated June 16, 1863.

*To all whom it may concern:*

Be it known that GEORGE A. MITCHELL, of Turner, in the county of Androscoggin and State of Maine, has invented a new and useful Machine for Swaging Boot and Shoe Tips from Blanks of Sheet Metal; and I do hereby declare that the following, taken in connection with the accompanying drawings, is such a full, clear, and exact description of the same as to enable others skilled in the art to make and use the same.

In swaging articles from sheet metal it is usual to cause the swaging-instrument which is to force it into the die to approach the sheet metal at right angles to the plane of the sheet, or nearly so; but it has been ascertained that such mode of operation is not practical for forming tips for the toes of shoes and boots.

By the mode of operation which constitutes this invention the swage approaches and strikes the sheet-metal blank (previously cut to the required shape) at an angle of about forty degrees with the plane of its surface, the outer surface of the die on which the blank rests when first struck by the swage being at about that angle with the line of motion of the swage. In this way the required form can be given to form a complete tip at one operation; and this invention also consists in combining with a die and swage having the character above specified a guide or gage on that part of the outer face of the die-block which forms an obtuse angle with the plane of motion of the swage, so as to hold the sheet-metal blank in the position required relatively to that part of the die which is to form the portion of the tip which extends over the toe of the shoe or boot.

Figure 1 of the accompanying drawings is a plan view; Fig. 2, a side elevation; Fig. 3, a vertical section on line A B of Fig. 1; and Fig. 4, an end view of a machine embodying the principles of the said invention. Fig. 5 is a metal blank ready for swaging, and Fig. 6 represents the same blank after being swaged or formed into a tip.

In the said drawings, A is the platform, upon which is firmly established the frame-work of the machine, consisting of two upright posts, B, united at or near their tops by a cross-piece, C. A block, D, secured to the two posts at a convenient height from the floor or platform, supports the die box or holder E, here shown to consist of a quadrangular cast-iron casing open on top, and having through each of the four sides a screw, F, for properly adjusting the position of the die in relation to the plunger and for holding it in position when so adjusted.

The plunger I is fitted on ways H to freely slide in its up and down movements along the two upright posts B, and to be guided thereon with unerring accuracy. To the plunger is adjusted, by means of a dovetail joint, *a*, and ledge *c*, the swage or follower J, whose lower end is shaped in accordance with the interior or concavity of the tip when formed. The die G is a solid steel or other metal cast containing a cavity shaped to conform with the outside form of the tip, the cavity or mold being so disposed that either or both sides, corresponding, respectively, to the under side and the upper side of the tip, converge down and toward a plane passing centrally or nearly so through the body of the swage or follower in the line of its motion and in a direction parallel or nearly so with the under edge of the swage.

If the general arrangement of the machine be substantially that shown in the accompanying drawings—*i. e.*, if the follower or swage move in a vertical plane, the die resting on a horizontal table or block—then the top of the die should be beveled, forming an angle with the plane of motion of the swage of about forty degrees. Upon this bevel-face of the die is fixed, by means of screws *i*, a guide or gage, K, to hold in the proper position relatively to the swage or die the metal blank. The guide or gage is formed of a plate having a slot cut through it of such a shape as to snugly fit the converse side of the tip-blank, and is so adjusted onto the inclined die-face as that the part which is to form the portion of the tip that extends over the toe of the shoe or boot shall lap over and extend beyond the cavity in the die. The plate of which the gage is formed is of such thickness as to firmly hold the blank confined within its slot during the downward motion of the swage and to resist its force when it first acts obliquely on the sheet-metal blank.

In order to make the die and swage it is suggested to form the follower or swage of the exact shape of the intended tip. The die may then be cast upon the follower, which will form a perfect mold of the tip. The follower may then be reduced the thickness of the plate of the tip and finished.

The operation of the machine will be readily understood from the above description of its construction. The machine, if operated by hand, is provided with a handle, L, connected with the plunger. This is seized by the operator and raised to a convenient height, where it is held wedged in the tapering slot N. The blank is then placed to fit the guide or gage K. The plunger is then released from its hold and allowed to drop. The swage, penetrating the die-cavity at one stroke, forms and completes the tip.

Having now fully described and ascertained the nature of the said invention and the manner in which the same is or may be used or carried into effect, we would observe, in conclusion, that we do not confine or restrict ourselves to the precise details or arrangements which we have had occasion to describe, as many variations may be made therefrom without deviating from the principles or main features of the said invention; but

What is claimed as the invention of the said GEORGE A. MITCHELL, and desired to be secured by Letters Patent, is—

1. The die-block formed to give the required shape to the outside of a shoe or boot tip, and with its outer face flat to receive and hold the sheet metal blank, substantially as described, in combination with a swage of the form of the inside of the tip to be produced, and so operated as to act on the sheet-metal blank at an angle, substantially as and for the purpose specified.

2. In combination with a die-block and swage having a mode of operation substantially as herein described, a guide or gage to hold the convex edge of the blank in the required position relatively to the die, and to resist the force of the swage when it first acts obliquely on the sheet-metal blank, substantially as described.

In testimony whereof we have hereunto set our hands in presence of two subscribing witnesses.

GEO. GOODYEAR,
*President,*
H. M. BEARCE,
*Treasurer,*
*The American Shoe Tip Company.*

Witnesses:
A. POLLOK,
JOSEPH GAVETT.